US012617216B2

(12) United States Patent
Tsuji et al.

(10) Patent No.: US 12,617,216 B2
(45) Date of Patent: May 5, 2026

(54) PRINTER AND PRINTING METHOD

(71) Applicant: BROTHER KOGYO KABUSHIKI KAISHA, Nagoya (JP)

(72) Inventors: Yasunari Tsuji, Nagoya (JP); Akihiro Kobayashi, Yokkaichi (JP)

(73) Assignee: Brother Kogyo Kabushiki Kaisha, Nagoya (JP)

( * ) Notice: Subject to any disclaimer, the term of this patent is extended or adjusted under 35 U.S.C. 154(b) by 616 days.

(21) Appl. No.: 18/051,054

(22) Filed: Oct. 31, 2022

(65) Prior Publication Data

US 2023/0166533 A1 Jun. 1, 2023

(30) Foreign Application Priority Data

Nov. 26, 2021 (JP) ................................. 2021-192038

(51) Int. Cl.
*B41J 11/00* (2006.01)
*B41J 2/165* (2006.01)
(Continued)

(52) U.S. Cl.
CPC ..... *B41J 11/00214* (2021.01); *B41J 2/16514* (2024.05); *B41J 11/06* (2013.01); (Continued)

(58) Field of Classification Search
CPC .... B41J 11/00214; B41J 11/06; B41J 25/001; B41J 25/3082; B41J 29/17; B41J 29/393; B41J 2/16514; B41J 29/02; B41J 2002/16573; B41J 2/16508; B41J 2/16526; B41J 2/1714
See application file for complete search history.

(56) References Cited

U.S. PATENT DOCUMENTS

2002/0054185 A1 5/2002 Kinoshita
2002/0196298 A1* 12/2002 Cheng .................. B41J 2/04588 347/9

(Continued)

FOREIGN PATENT DOCUMENTS

CN 210415929 U 4/2020
DE 102014106348 A1 11/2015

(Continued)

OTHER PUBLICATIONS

English Translation JP2005186422A (Year: 2005).*
English Translation JP2001315347 A (Year: 2001).*

*Primary Examiner* — Shelby L Fidler
*Assistant Examiner* — Tracey M Mcmillion
(74) *Attorney, Agent, or Firm* — Scully, Scott, Murphy & Presser, P.C.

(57) ABSTRACT

A printer includes a platen, a head which ejects light-curable ink to a printing object placed on the platen, a lamp which irradiates the printing object, on which the light-curable ink ejected from the head is adhered, with light, a carriage which supports the head and the lamp and which moves the head and the lamp in a main scanning direction, an ink recovering mechanism which faces a predetermined position within a predetermined area where the head is movable with movement of the carriage and which recovers the light-curable ink ejected from the head, and a controller which controls the head, the lamp, the carriage, and the ink recovering mechanism.

15 Claims, 11 Drawing Sheets

(51) Int. Cl.

| | |
|---|---|
| ***B41J 11/06*** | (2006.01) |
| ***B41J 25/00*** | (2006.01) |
| ***B41J 25/308*** | (2006.01) |
| ***B41J 29/17*** | (2006.01) |
| ***B41J 29/393*** | (2006.01) |

(52) U.S. Cl.

CPC ......... *B41J 25/001* (2013.01); *B41J 25/3082* (2013.01); *B41J 29/17* (2013.01); *B41J 29/393* (2013.01); *B41J 2002/16573* (2013.01)

(56) References Cited

U.S. PATENT DOCUMENTS

| | | | | |
|---|---|---|---|---|
| 2010/0156985 | A1 | 6/2010 | Sugarhara | |
| 2011/0025736 | A1 | 2/2011 | Doo | |
| 2012/0314010 | A1 | 12/2012 | Seki et al. | |
| 2014/0313260 | A1 | 10/2014 | Komatsu et al. | |
| 2021/0245516 | A1* | 8/2021 | Murayama | B41J 2/16535 |
| 2021/0300033 | A1* | 9/2021 | Kondo | B41J 2/04573 |

FOREIGN PATENT DOCUMENTS

| | | | | |
|---|---|---|---|---|
| JP | 2001315347 | A | * | 11/2001 |
| JP | 2002-205390 | A | | 7/2002 |
| JP | 2005186422 | A | * | 7/2005 |
| JP | 2005246698 | A | | 9/2005 |
| JP | 2008062433 | A | | 3/2008 |
| JP | 2008-114409 | A | | 5/2008 |
| JP | 2008-229966 | A | | 10/2008 |
| JP | 2009-269317 | A | | 11/2009 |
| JP | 2010-143179 | A | | 7/2010 |
| JP | 2010-158910 | A | | 7/2010 |
| JP | 2012-162010 | A | | 8/2012 |
| JP | 2013-890 | A | | 1/2013 |
| JP | 2014223800 | A | | 12/2014 |
| JP | 2015193142 | A | * | 11/2015 |
| JP | 2017-200740 | A | | 11/2017 |
| JP | 2021-30595 | A | | 3/2021 |
| JP | 2021-112847 | A | | 8/2021 |

* cited by examiner

PRINTER AND PRINTING METHOD

REFERENCE TO RELATED APPLICATIONS

This application claims priority from Japanese Patent Application No. 2021-192038 filed on Nov. 26, 2021. The entire content of the priority application is incorporated herein by reference.

BACKGROUND ART

Conventionally, there is known an image recording apparatus using a light-curable ink to record images on a printing object. Such an image recording apparatus includes a recording head, an ultraviolet ray irradiating device, and a maintenance mechanism. In recording an image, the image recording apparatus ejects the ink from the recording head onto the printing object while moving the recording head reciprocatingly in a main scanning direction within a recording area. Then, the ultraviolet ray irradiating device irradiates the ink landed on the printing object with ultraviolet ray. By virtue of this, the ink is cured and fastened such that the image is recorded on the printing object. On the other hand, in maintenance, the image recording apparatus moves the recording head to a maintenance area. Next, in the image recording apparatus, the ink in the recording head is sucked via a suction cap of the maintenance mechanism. Next, the image recording apparatus causes the recording head to eject the ink toward a receiver of the maintenance mechanism. In the above manner, the recording head is prepared in a preferable condition for carrying out an image recording again.

DESCRIPTION

In the case of a printer using a light-curable ink, light of a lamp may be reflected from a printing object and the head is irradiated with the light reflected so as to cure the ink in nozzles of the head. In order to prevent the cured ink from clogging the nozzles, after the ink is ejected onto the printing object from the head, it is necessary to immediately discharge the ink remaining in the nozzles of the head. In the above image recording apparatus, although the ink is discharged from the recording head in maintenance, the ink is not discharged from the recording head in image recording. Therefore, there is a problem that the ink inside the nozzles may be cured in image recording so as to clog the nozzles.

An object of the present disclosure is to provide a printer and a printing method capable of preventing nozzle clogging by immediately discharging the ink remaining in the nozzles of the head in printing operations.

According to a first aspect of the present disclosure, there is provided a printer including:

- a platen;
- a head configured to eject light-curable ink to a printing object placed on the platen;
- a lamp configured to irradiate the printing object, on which the light-curable ink ejected from the head is adhered, with light;
- a carriage configured to support the head and the lamp, and to move the head and the lamp in a main scanning direction;
- an ink recovering mechanism facing a predetermined position within a predetermined area where the head is movable with movement of the carriage, and configured to recover the light-curable ink ejected from the head; and
- a controller configured to control the head, the lamp, the carriage, and the ink recovering mechanism, wherein the controller is configured to:

- cause the carriage to move the head and dispose the head at the predetermined position at a timing within a printing period from start to end of a printing on the printing object;
- cause the head to eject the light-curable ink toward the ink recovering mechanism with the head being disposed at the predetermined position; and
- cause the ink recovering mechanism to recover the light-curable ink ejected from the head.

The controller causes the head to eject the light-curable ink therefrom toward the ink recovering mechanism in the printing period. By virtue of this, it is possible to discharge the light-curable ink remaining in the nozzles of the head, thereby preventing the nozzles from clogging. On this occasion, the printer can properly prevent the nozzles from clogging because even if the light-curable ink supplied to the head for printing remains in the nozzles, the light-curable ink can still be discharged from the nozzles immediately during the printing period.

In the first aspect, the printer may further include a mobile recovering mechanism supported by the carriage and configured to move together with the head to recover the light-curable ink ejected from the head, and the controller may be configured to stop recovering the light-curable ink by the mobile recovering mechanism, under a condition that the light-curable ink ejected from the head is recovered by the ink recovering mechanism. The printer can prevent the direction of ejecting the light-curable ink from the head toward the ink recovering mechanism, from being changed by driving the mobile recovering mechanism. Therefore, it is possible to reduce the possibility of adhering the ink ejected toward the ink recovering mechanism to other parts than the ink recovering mechanism.

In the first aspect, the ink recovering mechanism may be provided as a part of the platen, and the controller may be configured to: dispose the head at the predetermined position facing the ink recovering mechanism; cause the head to eject the light-curable ink toward the ink recovering mechanism with the head being disposed at the predetermined position; and cause the ink recovering mechanism to recover the light-curable ink ejected from the head. The printer can shorten the time deeded to move the head to the predetermined position in the printing period. Therefore, it is possible to prevent the nozzles from clogging because even if the light-curable ink supplied to the head for printing remains in the nozzles, the light-curable ink remaining in the nozzles can still be discharged immediately.

In the first aspect, the printer may further include a sensor configured to detect a distance between the head and the printing object, and the controller may be configured to specify that the head has been moved to the predetermined position based on a result detected by the sensor. The printer can let the sensor specify that the head has been disposed in the predetermined position, and can let the head eject the light-curable ink toward the ink recovering mechanism.

In the first aspect, the carriage may be configured to: support the head and the lamp with the head being disposed on one side in the main scanning direction with respect to the lamp; and support the sensor at an end portion on the one side in the main scanning direction. The printer causes the carriage to move to the one side in the main scanning direction to carry out printing. That is, a sensor is provided at the leading end of the head in the moving direction in printing. Therefore, it is possible for the sensor to specify that the head has been disposed in the predetermined position facing the ink recovering mechanism provided at the one side of the printing object in the main scanning direction.

In the first aspect, the sensor may include a first sensor and a second sensor, and the carriage may be configured to: support the first sensor at an end on one side in a sub scanning direction orthogonal to the main scanning direction; and support the second sensor at another end on the other side in the sub scanning direction. The printer is provided with the sensors at both sides in the sub scanning direction, such that it is possible to reduce the possibility of the head deviating from the predetermined position in the sub scanning direction.

In the first aspect, the timing may be included in a period of time between completion of movement in the main scanning direction of the head by the carriage and next start of the movement in the main scanning direction of the head by the carriage. In carrying out printing while moving the head in the main scanning direction, the printer ejects the light-curable ink from the head during the period from the head finishing the moving in the main scanning direction to the head starting the next moving in the main scanning direction. Therefore, the printer can properly prevent the nozzles from clogging because even if the light-curable ink supplied to the head for printing remains in the nozzles, the light-curable ink can still be discharged from the nozzles immediately during the printing period.

In the first aspect, the carriage may be configured to support the head and the lamp with the head being disposed on one side in the main scanning direction with respect to the lamp, and the predetermined position may be a position of the head at completion of movement toward the one side in the main scanning direction of the head by the carriage. The printer can shorten the time deeded to move the head to the predetermined position in the printing period. Therefore, the printer can prevent the nozzles from clogging because even if the light-curable ink supplied to the head for printing remains in the nozzles, the light-curable ink remaining in the nozzles can still be discharged immediately.

In the first aspect, the controller may be configured to: acquire printing object information related to the printing object; and determine ejection frequency of the light-curable ink from the head toward the ink recovering mechanism based on the printing object information acquired. The printer can eject the light-curable ink from the head at the most proper frequency according to each driving condition even if the driving condition differs with a printing object in printing.

According to a second aspect of the present disclosure, there is provided a printer including:

- a platen;
- a head configured to eject light-curable ink to a printing object placed on the platen;
- a lamp configured to irradiate the printing object, on which the light-curable ink ejected from the head is adhered, with light;
- a carriage configured to support the head and the lamp, and to move the head and the lamp in a main scanning direction;
- a first recovering mechanism provided in a part of the platen to face a first predetermined position within a predetermined area where the head is movable with movement of the carriage, and configured to recover the light-curable ink ejected from the head;
- a second recovering mechanism facing a second predetermined position within the predetermined area, and configured to recover the light-curable ink ejected from the head; and
- a controller configured to control the head, the lamp, the carriage, the first recovering mechanism, and the second recovering mechanism, wherein the controller is configured to:

- cause the head to be disposed at the first predetermined position at a first timing included in a printing period from start to end of a printing on the printing object, and cause the head to be disposed at the second predetermined position at a second timing included in a period of time between completion of movement in the main scanning direction of the head by the carriage and next start of the movement in the main scanning direction of the head by the carriage;
- cause the head to eject the light-curable ink toward the first recovering mechanism with the head being disposed at the first predetermined position and cause the head to eject the light-curable ink toward the second recovering mechanism with the head being disposed at the second predetermined position;
- cause the first recovering mechanism to recover the light-curable ink ejected from the head toward the first recovering mechanism and cause the second recovering mechanism to recover the light-curable ink ejected from the head toward the second recovering mechanism;
- acquire printing object information related to the printing object; and
- switch between causing the head to eject the light-curable ink toward the first recovering mechanism and causing the head to eject the light-curable ink toward the second recovering mechanism, according to the printing object information acquired.

According to the second aspect, it is possible to exert the same effects as the first aspect. Further, it is possible to switch between causing the head to eject the light-curable ink therefrom toward the first recovering mechanism and causing the head to eject the light-curable ink therefrom toward the second recovering mechanism, according to each printing object.

In the second aspect, the printer may further include a sensor configured to detect a distance between the head and the printing object, and the controller may be configured to specify that the head has been moved to the first predetermined position based on a result detected by the sensor. The printer can let the sensor specify that the head has been disposed in the first predetermined position, and can let the head eject the light-curable ink toward the first recovering mechanism.

In the second aspect, the carriage may be configured to support the head and the lamp with the head being disposed on one side in the main scanning direction with respect to the lamp, and the second predetermined position may be a position of the head at completion of movement toward the one side in the main scanning direction of the head by the carriage. The printer can shorten the time deeded to move the head to the second predetermined position in the printing period. Therefore, the printer can prevent the nozzles from clogging by immediately discharging the light-curable ink remaining in the nozzles.

According to a third aspect of the present disclosure, there is provided a printing method carried out by a printer, the printer comprising:

- a platen;

a head configured to eject light-curable ink to a printing object placed on the platen;

a lamp configured to irradiate the printing object, on which the light-curable ink ejected from the head is adhered, with light;

a carriage configured to support the head and the lamp, and to move the head and the lamp in a main scanning direction; and an ink recovering mechanism facing a predetermined position within a predetermined area where the head is movable with movement of the carriage, and configured to recover the light-curable ink ejected from the head, the printing method comprising:

causing the carriage to move the head to dispose the head at the predetermined position at a timing within a printing period from start to end of a printing on the printing object;

causing the head to eject the light-curable ink toward the ink recovering mechanism with the head being disposed at the predetermined position; and causing the ink recovering mechanism to recover the light-curable ink ejected from the head. According to the third aspect, it is possible to exert the same effects as the first aspect.

In the third aspect, the printer may further include a mobile recovering mechanism supported by the carriage and configured to move together with the head to recover the light-curable ink ejected from the head, and recovering the light-curable ink by the mobile recovering mechanism may be stopped, under a condition that the light-curable ink ejected from the head is recovered by the ink recovering mechanism. In this configuration, it is possible to exert the same effects as the first aspect.

According to a fourth aspect of the present disclosure, there is provided a printing method carried out by a printer, the printer comprising:

a platen;

a head configured to eject light-curable ink to a printing object placed on the platen;

a lamp configured to irradiate the printing object, on which the light-curable ink ejected from the head is adhered, with light;

a carriage configured to support the head and the lamp, and to move the head and the lamp in a main scanning direction;

a first recovering mechanism provided in a part of the platen, facing a first predetermined position within a predetermined area where the head is movable with movement of the carriage, and configured to recover the light-curable ink ejected from the head;

a second recovering mechanism facing a second predetermined position within the predetermined area, and configured to recover the light-curable ink ejected from the head; and a controller configured to control the head, the lamp, the carriage, the first recovering mechanism, and the second recovering mechanism, the printing method comprising:

causing the head to be disposed at the first predetermined position at a first timing included in a printing period from start to end of a printing on the printing object, and causing the head to be disposed at the second predetermined position at a second timing included in a period of time between completion of movement in the main scanning direction of the head by the carriage and next start of the movement in the main scanning direction of the head by the carriage;

causing the head to eject the light-curable ink toward the first recovering mechanism with the head being disposed at the first predetermined position and causing the head to eject the light-curable ink toward the second recovering mechanism with the head being disposed at the second predetermined position;

causing the first recovering mechanism to recover the light-curable ink ejected from the head toward the first recovering mechanism and causing the second recovering mechanism to recover the light-curable ink ejected from the head toward the second recovering mechanism;

acquiring printing object information related to the printing object; and switching between causing the head to eject the light-curable ink toward the first recovering mechanism and causing the head to eject the light-curable ink toward the second recovering mechanism, according to the printing object information acquired. According to the fourth aspect, it is possible to exert the same effects as the first aspect.

Referring to the accompanied drawings, a printer 1 according to the present disclosure will be explained. The up or upper side, down or lower side, left lower side, right upper side, right lower side, and left upper side of FIG. 1 correspond to the upper side, lower side, front side, rear side, right side, and left side of the printer 1, respectively.

<Outline of the Printer 1>

Figure 1:
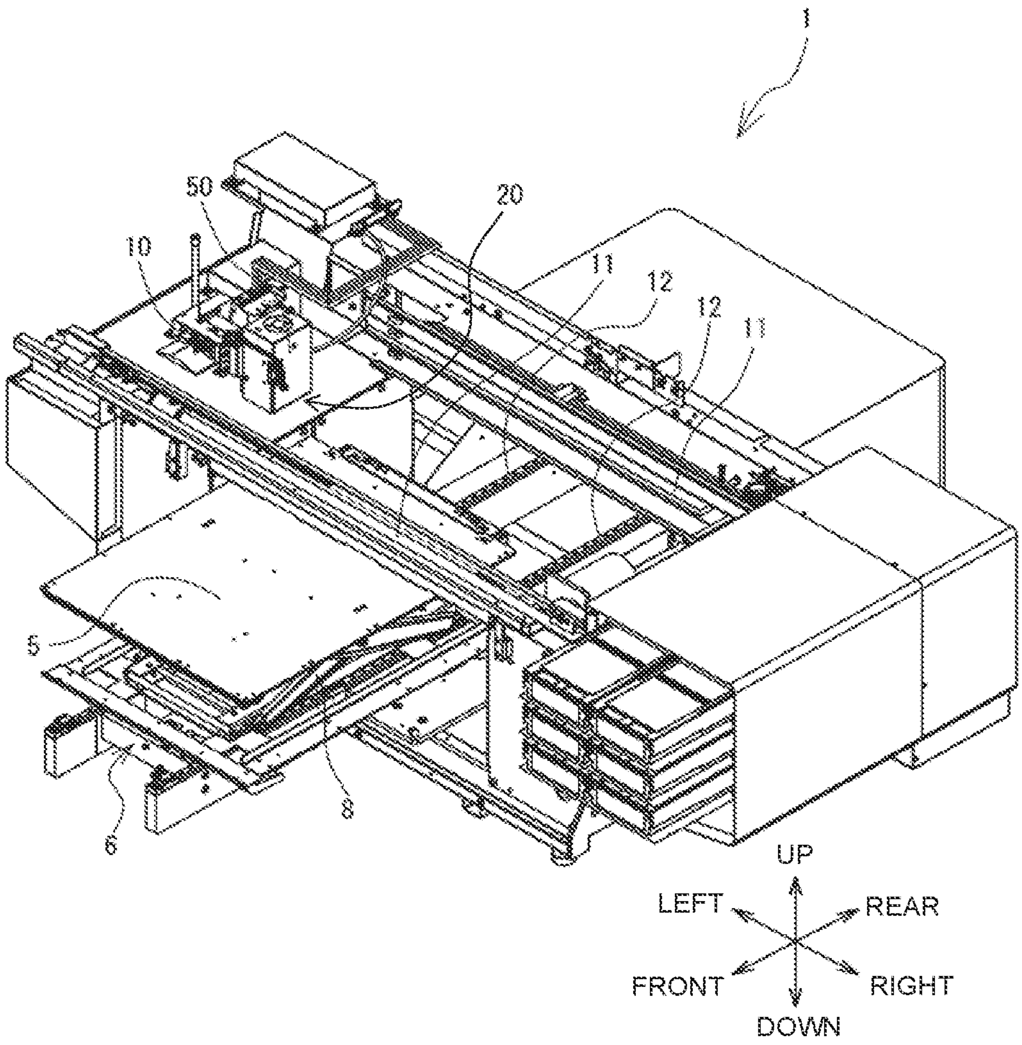
FIG. 1 is a perspective view of a printer.
Figure 2:
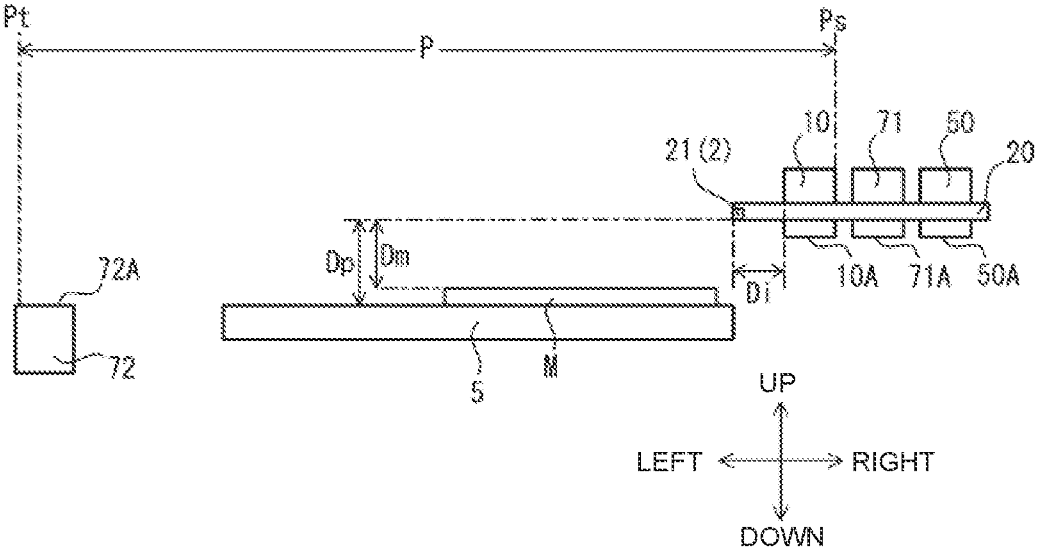
FIG. 2 depicts a positional relation between a carriage arranged in the rightmost end position, a platen, and an ink recovering mechanism.

Referring to FIGS. 1 and 2, a schematic configuration of the printer 1 will be explained. As depicted in FIG. 1, the printer 1 includes a conveying mechanism 6, an ascending/descending mechanism 8, and a platen 5. The conveying mechanism 6 is provided in a lower portion of the printer 1, including a pair of rails 12. The pair of rails 12 extend in a front/rear direction to align side by side in a left/right direction.

The ascending/descending mechanism 8 is provided above the conveying mechanism 6 and supported by the pair of rails 12. The ascending/descending mechanism 8 is driven by a sub scanning motor 32 (see FIG. 7) to move in the front/rear direction along the pair of rails 12. The ascending/descending mechanism 8 is driven by an ascending/descending motor 34 (see FIG. 7) to expand or contract in an up/down direction.

The platen 5 is provided above the ascending/descending mechanism 8. The platen 5 is a plate. The platen 5 is formed with, for example, a plurality of through holes therein. Below the platen 5, for example, a suction mechanism such as a pump or the like is provided. The ink discharged toward the platen 5 is sucked by the suction mechanism to move from the surface to the backside of the platen 5 through the plurality of through holes. Thereafter, the ink is recovered into a pan, sponge, or the like arranged below the platen 5 or the like. The platen 5 is supported by the ascending/descending mechanism 8. The platen 5 is moved in the up/down direction by the expansion or contraction of the ascending/descending mechanism 8 in the up/down direction. The platen 5 is moved in the front/rear direction by the movement of the ascending/descending mechanism 8 in the up/down direction. A printing object M (see FIG. 2) is placed on the upper surface of the platen 5. The printing object M is plate-like or sheet-like, for example, made of cloth, paper, plastic, or metal.

The printer 1 includes a pair of rails 11 and a carriage 20. The pair of rails 11 are provided above the platen 5. The pair of rails 11 extend in the left/right direction to align side by side in the front/rear direction. The carriage 20 is provided between the pair of rails 11 in the front/rear direction. The carriage 20 is a plate supported by the pair of rails 11. The carriage 20 is driven by a main scanning motor 31 (see FIG. 7) to move in the left/right direction along the pair of rails 11.

As depicted in FIG. 2, the carriage 20 supports a head 10, a mobile recovering mechanism 71, a lamp 50, and a sensor 2. The head 10, the mobile recovering mechanism 71, the lamp 50, and the sensor 2 are positioned above the platen 5. The head 10, the mobile recovering mechanism 71, the lamp 50, and the sensor 2 move in the left/right direction relative to the printing object M placed on the platen 5 according to the movement of the carriage 20 in the left/right direction.

The head 10 has a plurality of nozzles 10A in the lower surface thereof. The head 10 ejects the ink downward from the plurality of nozzles 10A. As an example, the ink is a so-called ultraviolet-curable ink to be irradiated with ultraviolet ray and cured. Hereinbelow, the term “predetermined area P” will refer to such an area that the head 10 is movable in the left/right direction according to the movement of the carriage 20. The term “rightmost end position Ps” will refer to the right end position in the predetermined area P. The term “leftmost end position Pt” will refer to the left end position in the predetermined area P.

The mobile recovering mechanism 71 is provided on the right side of the head 10. The mobile recovering mechanism 71 is a suction pump. The mobile recovering mechanism 71 has a suction port 71A in the lower surface thereof. The lamp 50 is provided on the right side of the mobile recovering mechanism 71. The lamp 50 includes an ultraviolet emitting diode. The lamp 50 emits ultraviolet light downward from a lower surface 50A thereof.

The sensor 2 is provided on the left side of the head 10. The sensor 2 is supported at the left end of the carriage 20. The sensor 2 is a ranging (or distance measurement) sensor, detecting the distance between itself and an object below itself. For example, the sensor 2 detects the distance between itself and the upper surface of the platen 5, and the distance between itself and the upper surface of the printing object M placed on the platen 5.

Hereinbelow, Dp will refer to the distance between the sensor 2 and the upper surface of the platen 5. Dm will refer to the distance between the sensor 2 and the upper surface of the printing object M. Di will refer to the distance between the sensor 2 and the left end of the head 10.

An ink recovering mechanism 72 is provided on the left of the platen 5. The ink recovering mechanism 72 includes a suction pump. The ink recovering mechanism 72 has a suction port 72A in the upper surface thereof. The suction port 72A is positioned below the plurality of nozzles 10A of the head 10 in the up/down direction. In the predetermined area P where the head 10 is movable in the left/right direction, the left side position of the ink recovering mechanism 72 corresponds to the leftmost end position Pt. That is, the ink recovering mechanism 72 is below leftmost end position Pt to face the leftmost end position Pt.

<Outline of the Printing Operation>

In the course of the carriage 20 carrying the head 10 to move leftward toward the leftmost end position Pt from the rightmost end position Ps, the distance detected by the sensor 2 changes from Dp to Dm. If the distance detected by the sensor 2 changes from Dp to Dm, then the printer 1 determines that the carriage 20 has leftward approached the printing object M placed on the platen 5, and the sensor 2 has arrived above at the right end of the printing object M. Further, if the carriage 20 has moved leftward through the distance Di since the arrival of the sensor 2 above at the right end of the printing object M, then the printer 1 determines that the head 10 has arrived above at the right end of the printing object M.

Figure 3A:
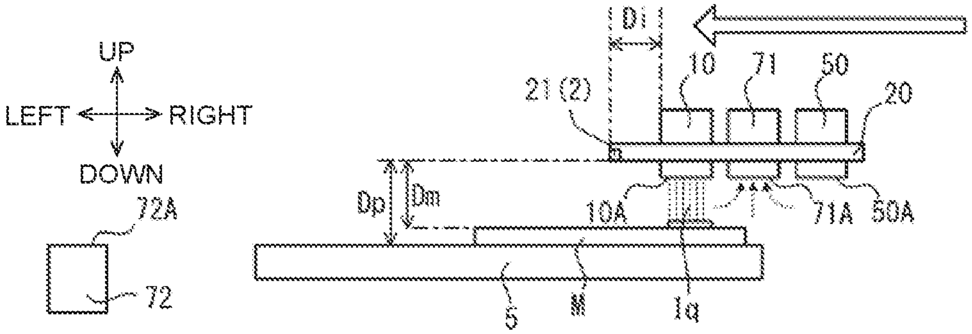
FIGS. 3A to 3D are explanatory views for a printing operation.

As depicted in FIG. 3A, the printer 1 ejects an ink Iq from the head 10 onto the printing object M after the head 10 arrives above at the right end of the printing object M. The ink Iq adheres to the printing object M. Further, the printer 1 drives the mobile recovering mechanism 71. By virtue of this, the printer 1 sucks and recovers, from the suction port 71A of the mobile recovering mechanism 71, the mist-like ink Iq being part of the ink Iq ejected from the head 10 and floating above the platen 5.

Figure 3B:
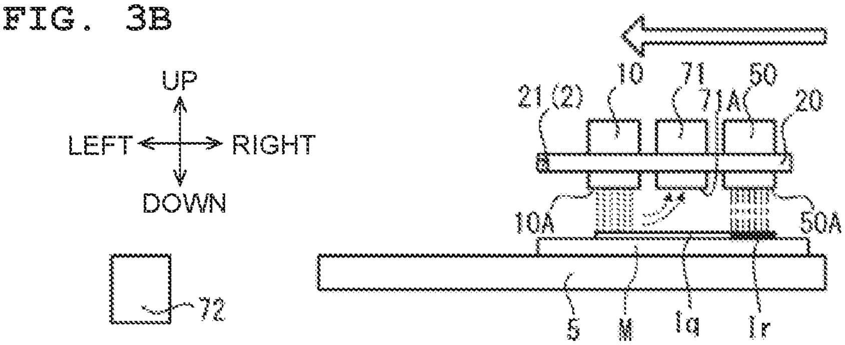

As depicted in FIG. 3B, along with the leftward movement of the head 10 due to the carriage 20, the lamp 50 reaches above the ink Iq adhered to the printing object M. The printer 1 emits the ultraviolet light from the lower surface 50A of the lamp 50 onto the printing object M on which the ink Iq is adhered. The ink Iq is cured by the ultraviolet light. In the figure, the sign Ir indicates the cured ink.

Figure 3C:
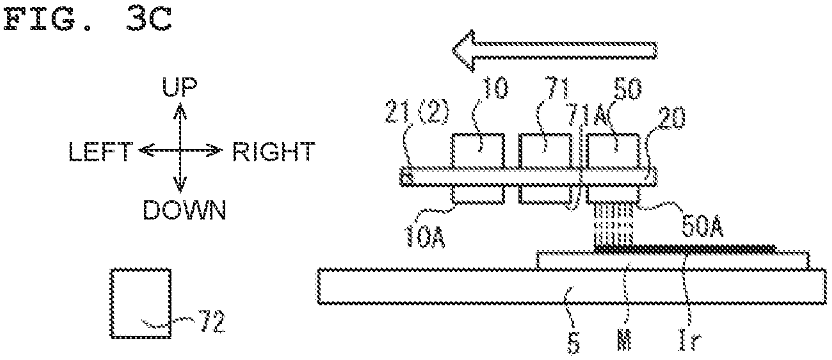

As depicted in FIG. 3C, in the course of the carriage 20 carrying the head 10 to move leftward to the leftmost end position Pt from the rightmost end position Ps, all of the ink Iq adhered to the printing object M is cured by the ultraviolet light from the lamp 50. By virtue of this, in the entire print image to be printed on the printing object M, one line of the print image extending in the left/right direction (to be referred to below as “line image”) is finished with printing.

Figure 3D:
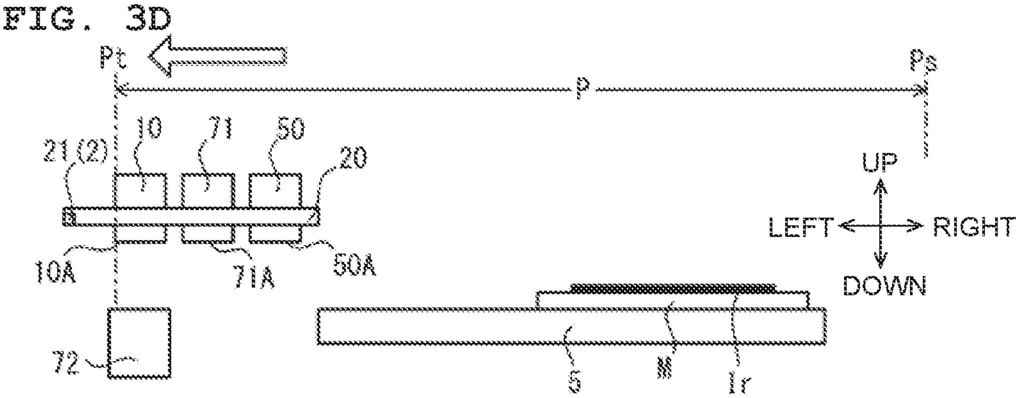

As depicted in FIG. 3D, if the carriage 20 carries the head 10 to move leftward as far as to the leftmost end position Pt, then the printer 1 finishes the carriage 20 with the leftward movement. That is, the leftmost end position Pt is the position when the head 10 is finished with the leftward movement due to the carriage 20. On this occasion, the head 10 is positioned above the ink recovering mechanism 72.

Next, the printer 1 carries out the following operation for printing the next line image on a part adjacent on the front side to the line image finished with printing in the printing object M.

Figure 4A:
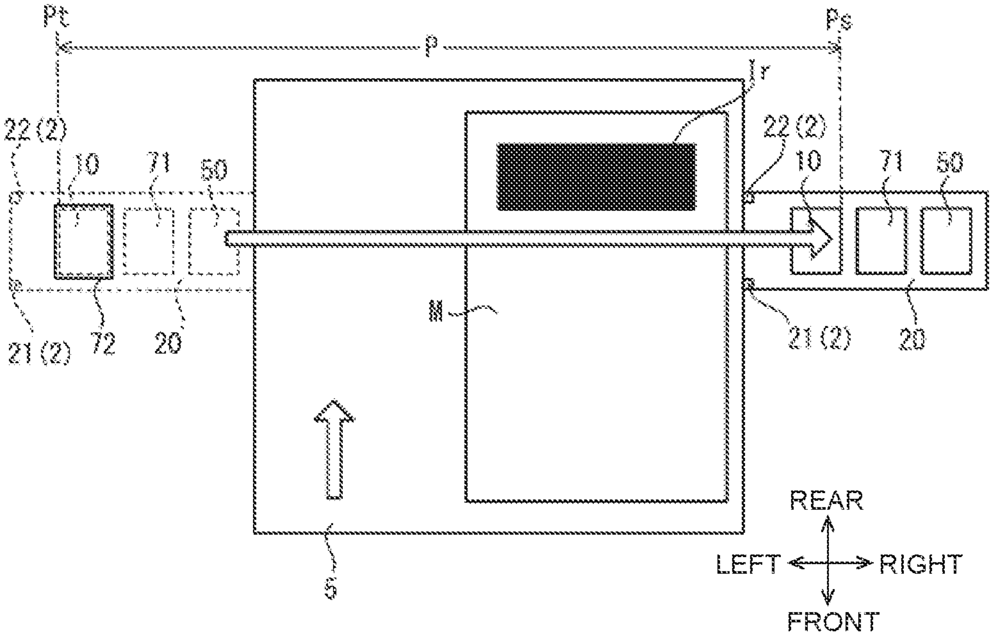
FIGS. 4A and 4B are explanatory views for the printing operation, succeeding FIGS. 3A to 3D.

As depicted in FIG. 4A, the printer 1 causes the carriage 20 to move the head 10 rightward from the leftmost end position Pt to the rightmost end position Ps. Further, the printer 1 causes the platen 5 to move rearward as far as through the length of the line image in the front/rear direction. Next, the printer 1 controls the carriage 20, the head 10, the mobile recovering mechanism 71, and the lamp 50 by the same procedure as depicted in FIGS. 3A to 3D. By virtue of this, as depicted in FIG. 4B, a new line image is printed on the front side of the line image printed on the printing object M according to the previous leftward movement of the carriage 20.

Figure 4B:
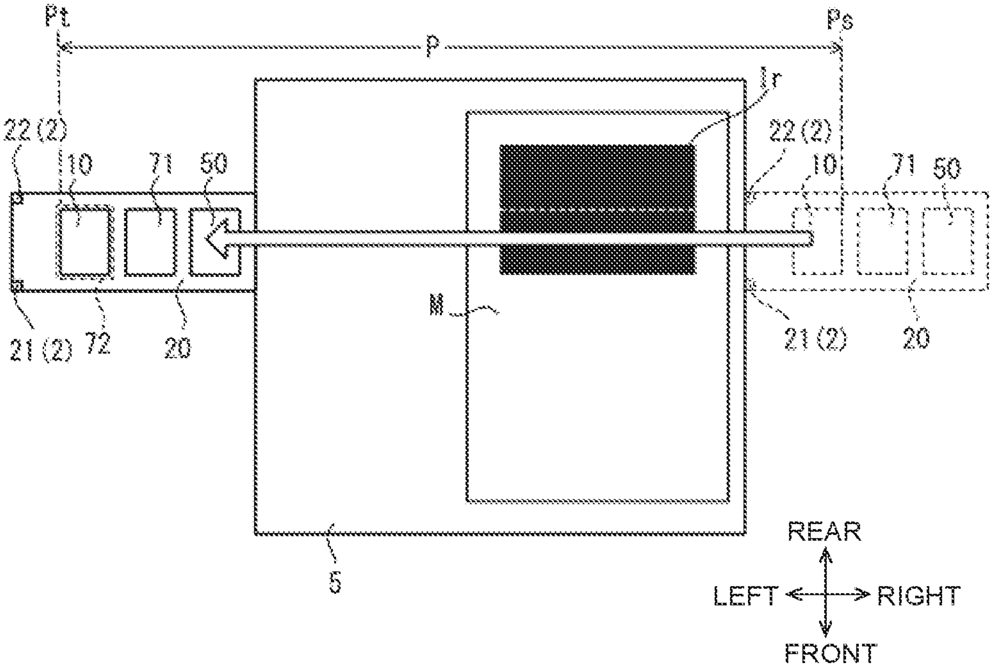

As depicted in FIGS. 4A and 4B, the sensor 2 has a first sensor 21 and a second sensor 22. The first sensor 21 is supported at the front end of the carriage 20. The second sensor 22 is supported at the rear end of the carriage 20. With the first sensor 21 and the second sensor 22, the printer 1 determines the positions of the head 10 in the left/right direction with respect to the platen 5 and the printing object M.

<Ink Recovery Process>

The printer 1 determines that clogging may occur due to the ink cured in a nozzle 10A from which no ink has been ejected continuously from a predetermined time or longer. Hereinbelow, the term "target nozzle" will be used to refer to a nozzle 10A which is determined to have a possibility of clogging brought in by the cured ink. In order to prevent the clogging in the target nozzle, the printer 1 carries out an ink recovery process by either of the following two methods (a first ink recovery method and a second ink recovery method) to eject the ink Iq from the target nozzle.

<First Ink Recovery Method>

Figure 5A:
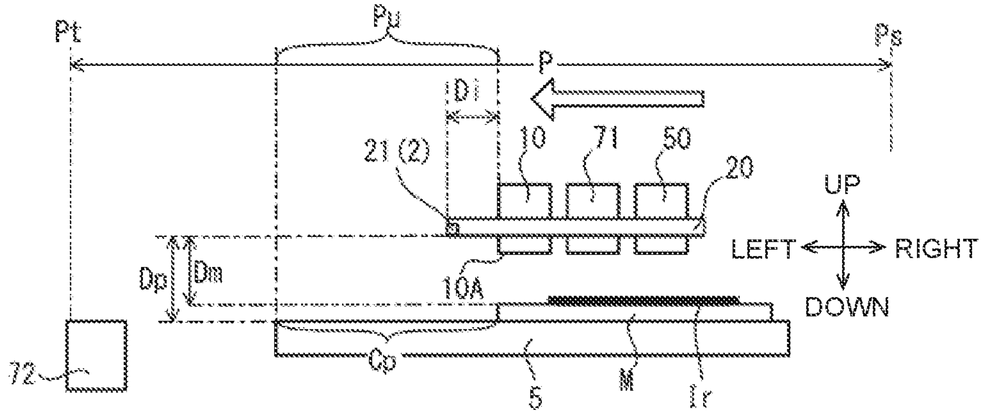
FIGS. 5A and 5B are explanatory views for a first recovery method.

After a line image is finished with printing, if the distance detected by the sensor 2 has changed from Dm to Dp, then the printer 1 determines that the sensor 2 has passed above through the left end of the printing object M placed on the platen 5 and arrived at the left side of the part of the platen 5 where the printing object M is placed. Further, if the carriage 20 has moved leftward through the distance Di since the sensor 2 passing above through the left end of the printing object M, then the printer 1 determines, as depicted in FIG. 5A, that the head 10 has arrived above at the left side of the part of the platen 5 where the printing object M is placed.

Figure 5B:
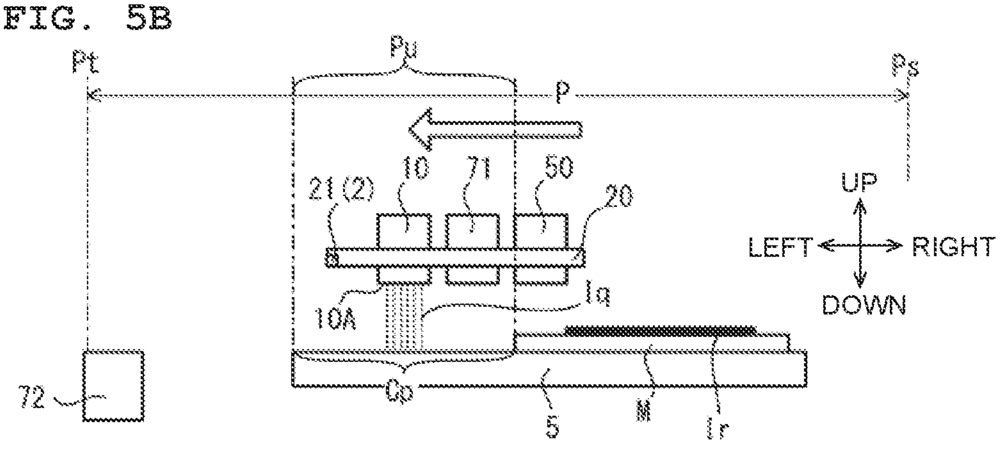

As depicted in FIG. 5B, the printer 1 moves the carriage 20 leftward continuously while ejecting the ink Iq onto the platen 5 from the target nozzle of the head 10. By virtue of this, the ink Iq remaining in the target nozzle is discharged such that the target nozzle is prevented from clogging.

Note that in the part of the platen 5 where the printing object M is placed, a plurality of through holes for recovering the ink Iq are covered by the printing object M. On the other hand, in the other part of the platen 5 than the part where the printing object M is placed, a plurality of through holes are exposed. Hereinbelow, the term "ink recovery holes Cp" will be used to refer to the plurality of through holes arranged at the left side of the printing object M in the left/right direction, among the plurality of through holes exposed in the platen 5 without the printing object M being placed thereon. In the predetermined area P where the head 10 is movable in the left/right direction, the position above the ink recovery holes Cp is referred to as "predetermined position Pu". The ink recovery holes Cp are below the predetermined position Pu to face the predetermined position Pu.

In the first ink recovery method, with the head 10 disposed in the predetermined position Pu, the ink Iq is ejected from the target nozzle. The ejected ink Iq is sucked by the suction mechanism provided for the platen 5 and recovered via the ink recovery holes Cp. Therefore, the ink recovery holes Cp function as another recovering mechanism for the ink Iq.

Note that during the period when the ink Iq is ejected toward the ink recovery holes Cp of the platen 5 from the target nozzle of the head 10 disposed in the predetermined position Pu, the mobile recovering mechanism 71 is stopped from driving. Therefore, during the period when the ink Iq is ejected from the target nozzle by the first ink recovery method, the mobile recovering mechanism 71 does not suck the ink Iq.

<Second Ink Recovery Method>

Figure 6A:
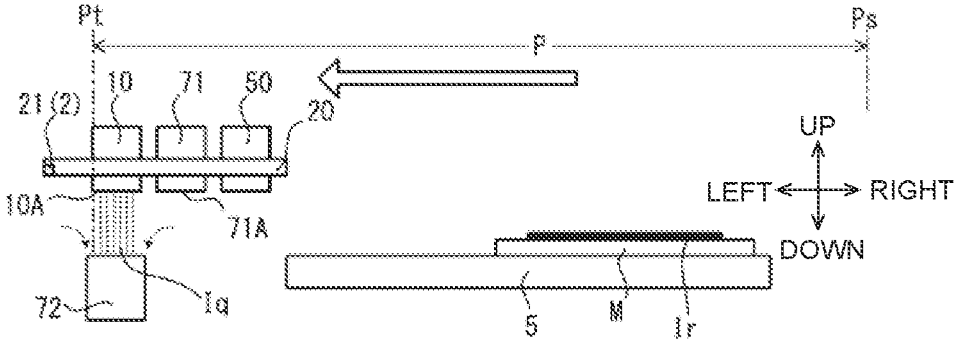
FIGS. 6A to 6C are explanatory views for a second recovery method.

In the course of the head 10 moving leftward due to the carriage 20, if the line image is finished with printing on the printing object M, then as depicted in FIG. 6A, the printer 1 causes the carriage 20 to carry the head 10 to move leftward up to the leftmost end position Pt. If the head 10 has moved leftward to the leftmost end position Pt, then the printer 1 finishes the carriage 20 with the leftward movement. In this state, the printer 1 ejects the ink Iq from the target nozzle of the head 10 disposed in the leftmost end position Pt. By virtue of this, the ink Iq remaining in the target nozzle is discharged to prevent the target nozzle from clogging. Note that the ejected ink Iq is sucked via the suction port 72A of the ink recovering mechanism 72. After a predetermined time has elapsed, the target nozzle is stopped from ejecting the ink Iq, and the ink recovering mechanism 72 is stopped from sucking the ink Iq.

Figure 6B:
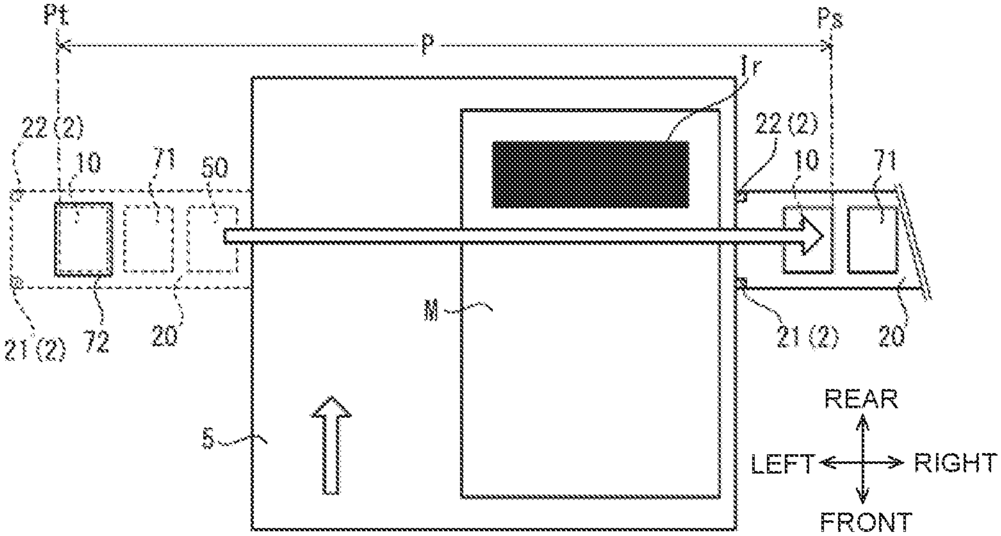

Next, as depicted in FIG. 6B, the printer 1 causes the carriage 20 to move the head 10 rightward from the leftmost end position Pt to the rightmost end position Ps in order to print the next line image on the printing object M. Further, the printer 1 moves the platen 5 rearward as far as through the length of the line image in the front/rear direction.

Figure 6C:
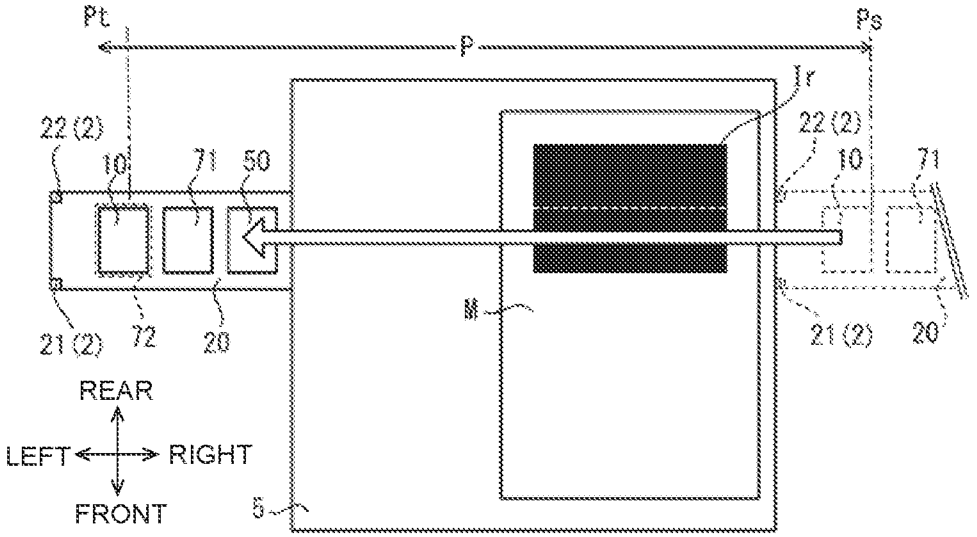

Next, the printer 1 controls the carriage 20, the head 10, the mobile recovering mechanism 71, and the lamp 50 by the same procedure as depicted in FIGS. 3A to 3D. By virtue of this, as depicted in FIG. 6C, a new line image is printed on the front side of the line image already printed on the printing object M.

If the carriage 20 carries the head 10 to move leftward up to the leftmost end position Pt, then the printer 1 finishes the carriage 20 with the leftward movement. The printer 1 ejects the ink Iq from the target nozzle of the head 10 disposed in the leftmost end position Pt. By virtue of this, the ink Iq remaining in the target nozzle is discharged. Note that the ejected ink Iq is sucked via the suction port 72A of the ink recovering mechanism 72.

In the above manner, in the second ink recovery method, printing the next line image is started after the current line image is finished with printing with the leftward movement of the head 10 being completed. Therefore, during the period until the head 10 starts to move rightward, the ink Iq is ejected from the target nozzle and recovered by the ink recovering mechanism 72.

<Electrical Configuration of the Printer 1>

Figure 7:
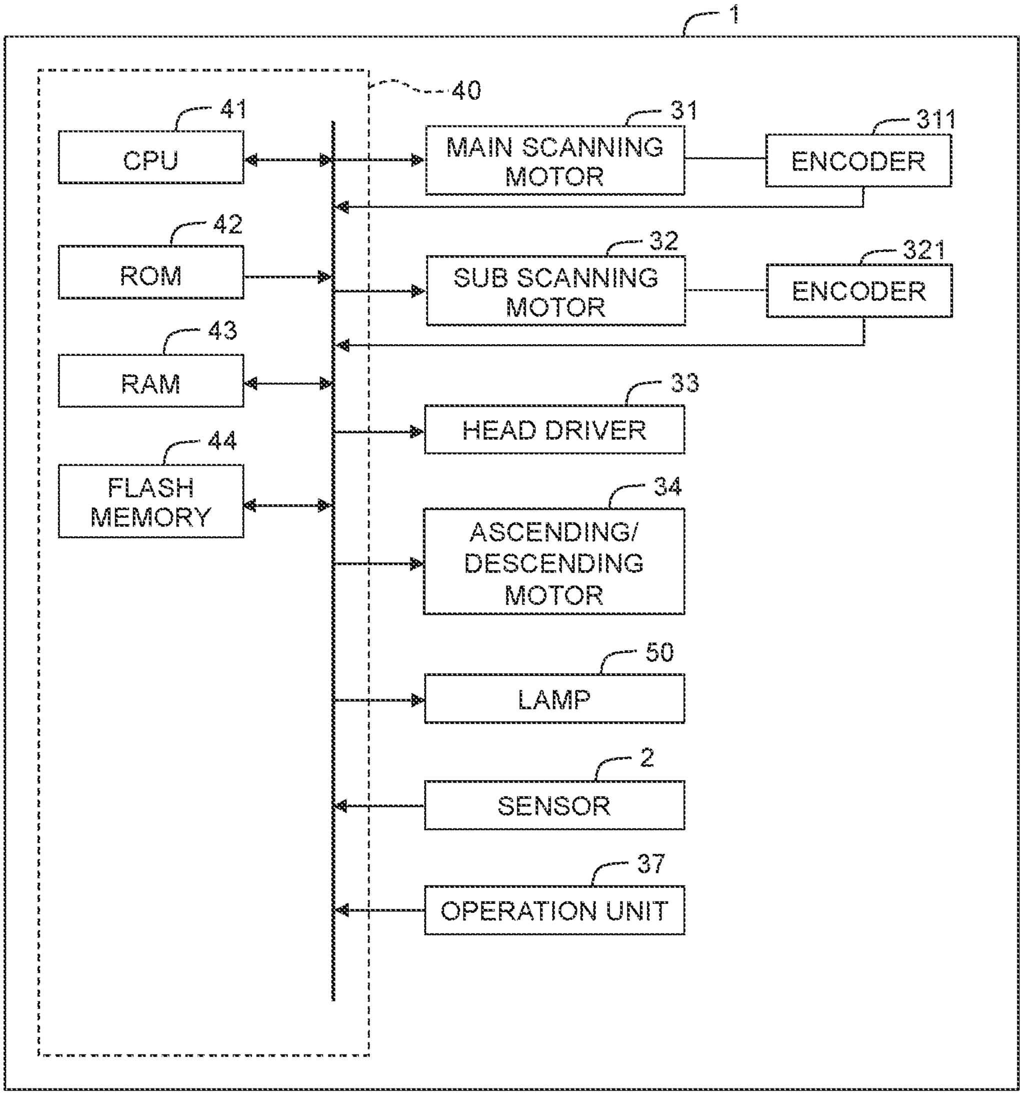
FIG. 7 is a block diagram depicting an electrical configuration of the printer.

Referring to FIG. 7, an electrical configuration of the printer 1 will be explained. The printer 1 includes a control substrate 40. The control substrate 40 is provided thereon with a CPU 41, a ROM 42, a RAM 43, and a flash memory 44. The CPU 41 is in charge of controlling the printer 1, and is connected electrically with the ROM 42, the RAM 43, and the flash memory 44.

The ROM 42 stores programs for controlling operations of the printer 1, and information and the like needed for the CPU 41 to execute the various kinds of programs. The RAM 43 temporarily stores various data and the like to be used with the programs. The flash memory 44 is of a nonvolatile type storing print data and the like for carrying out printing.

The CPU 41 is electrically connected with the main scanning motor 31, the sub scanning motor 32, encoders 311 and 321, a head driver 33, the ascending/descending motor 34, the lamp 50, the sensor 2, and an operation unit 37. The CPU 41 controls the driving of the main scanning motor 31, the sub scanning motor 32, the head driver 33, the ascending/descending motor 34, and the lamp 50.

The main scanning motor 31 is provided with the encoder 311. The encoder 311 detects a rotary angle of the main scanning motor 31 and outputs a detection signal to the CPU 41. The sub scanning motor 32 is provided with the encoder 321. The encoder 321 detects a rotary angle of the sub scanning motor 32 and outputs a detection signal to the CPU 41. The head driver 33 is a pressure element, heating element, or the like, and is driven to eject the ink from the plurality of nozzles 10A of the head 10. The operation unit 37 is a touch panel or the like to output information to the CPU 41 according to a user's operation. The user can operate on the operation unit 37 to input to the printer 1 a start command for the printer 1 to start printing.

<Main Process>

Figure 8A:
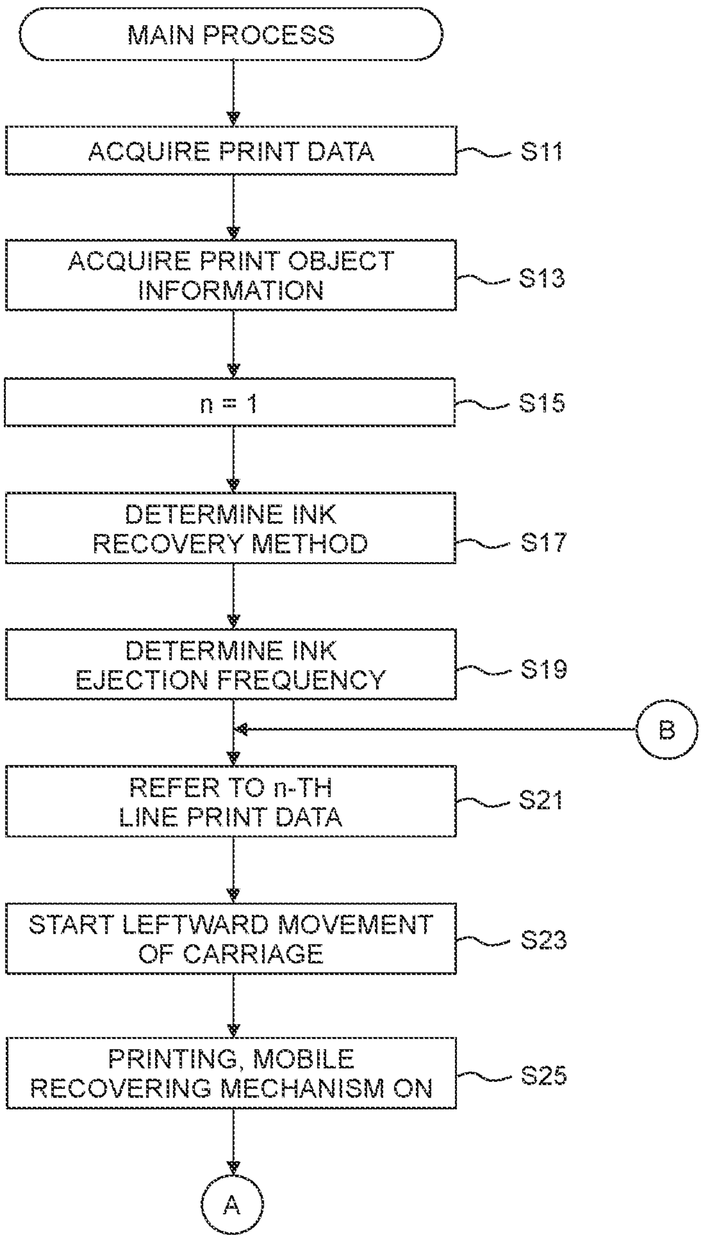
FIGS. 8A and 8B are a flow chart of a main process.
Figure 8B:
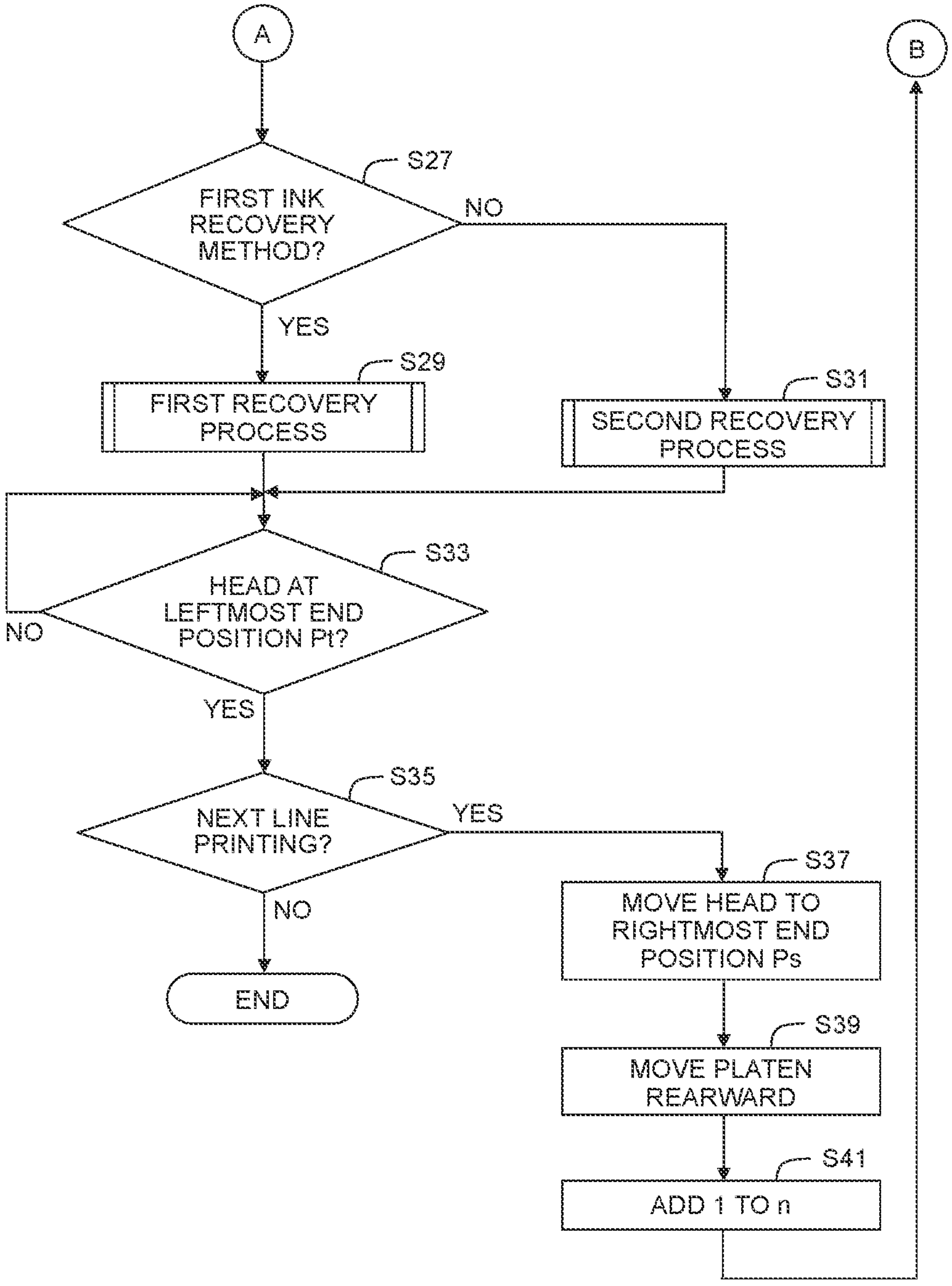
Figure 9:
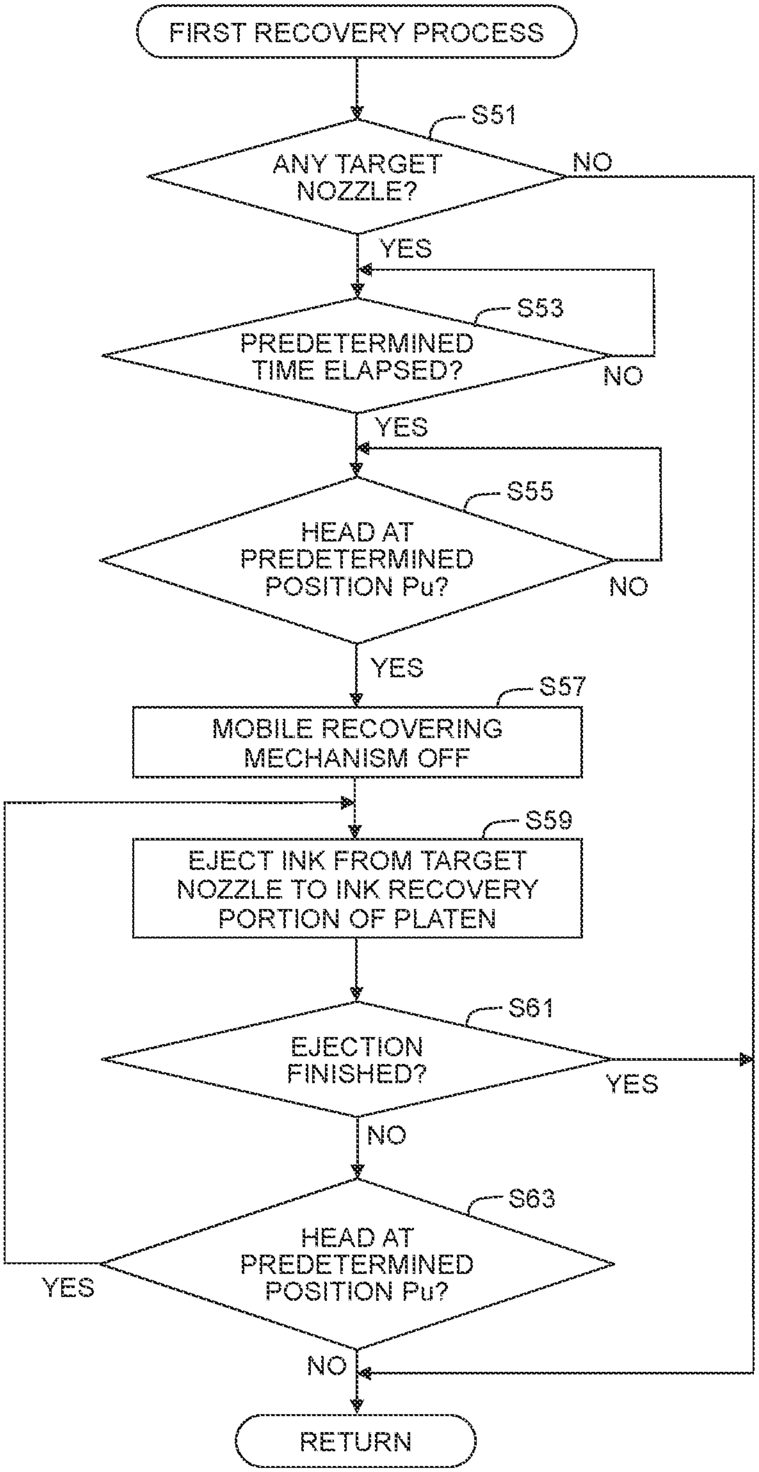
FIG. 9 is a flow chart of a first printing process.
Figure 10:
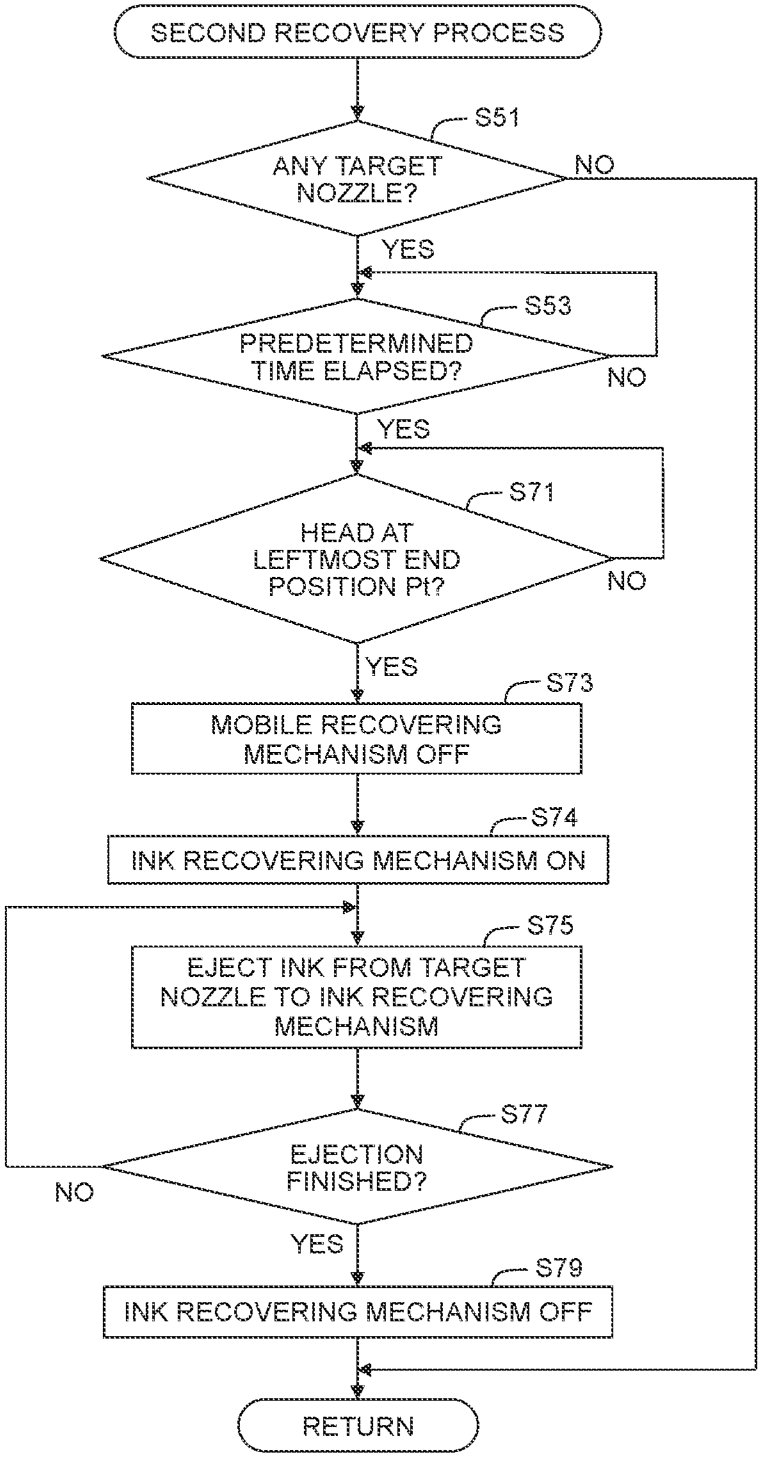
FIG. 10 is a flow chart of a second printing process.

Referring to FIGS. 8 to 10, a main process will be explained. If the user inputs the start command for starting a printing operation via the operation unit 37, then the CPU 41 starts the main process by reading out a program stored in the ROM 42 and executing the same. Note that the inputted start command includes print image information and print object information. The print image information indicates a print image desired by the user. The print object information indicates the material and size of the printing object M placed on the platen 5, and the position for the platen 5 to place the printing object M thereon.

As depicted in FIG. 8, the CPU 41 specifies the print image indicated by the print image information included in the inputted start command. The CPU 41 reads out from the flash memory 44 and acquires the print data for printing the specified print image on the printing object M (S11). The CPU 41 acquires the print object information included in the inputted start command (S13). The CPU 41 sets 1 to a variable n stored in the RAM 43 for initialization (S15).

Based on the print object information acquired in the step S13, the CPU 41 determines whether the first ink recovery method or the second ink recovery method to be used as the method for the ink recovery process (S17). A specific way to determine the ink recovery method is as follows, for example.

In the platen 5, the less the number of ink recovery holes Cp exposed without the printing object M being placed, the lower the upper limit of the ink amount recoverable via those ink recovery holes Cp (to be referred to below as "upper limit recovery amount"). Note that in the first ink recovery method, it is necessary to let the ink amount ejected toward the ink recovery holes Cp from the target nozzle be less than the upper limit recovery amount. This is because if the ejected ink amount is more than the upper limit recovery amount, then the ejected ink may not be completely recovered with the ink recovery holes Cp.

The number of ink recovery holes Cp is determined according to the size of the printing object M, and the position of the printing object M placed on the platen 5. Therefore, the CPU 41 specifies the number of ink recovery holes Cp of the platen 5 on the basis of the size of the printing object M and the position of the printing object M placed on the platen 5 which are indicated by the print object information. If the specified number of ink recovery holes Cp is larger than a predetermined threshold value, then the CPU 41 determines the first ink recovery method to be the method for the ink recovery process, whereas if the specified number of ink recovery holes Cp is smaller than the predetermined threshold value, then the CPU 41 determines the second ink recovery method to be the method for the ink recovery process.

Based on the print object information acquired in the step S13, the CPU 41 determines the frequency of ejecting the ink from the head 10 in the ink recovery process (S19). A specific way to determine the frequency of ejecting the ink is as follows, for example.

The printer 1 adjusts the ink amount ejected from the head 10 according to each material of the printing object M. Even if a print image of a common size is printed on the printing object M, the ink amount ejected from the head 10 still differs according to each material of the printing object M. In this case, the more the ink amount ejected from the head 10, the more likely the ink to remain in the target nozzle and thus the more likely the ink clogging to happen. Therefore, the CPU 41 determines the frequency of ejecting the ink from the target nozzle in the ink recovery process on the basis of the material of the printing object M indicated by the print object information.

Note that, for example, the ROM 42 may store a table prescribing the ink ejection frequency according to each material of the printing object M. The CPU 41 may refer to the table to determine the ink ejection frequency corresponding to the material of the printing object M indicated by the print object information acquired in the step S13.

The CPU 41 refers to the print data for printing the nth number of line images (to be referred to below as "the n-th line image") among the print data acquired in the step S11 (S21). The CPU 41 controls the main scanning motor 31 to cause the carriage 20 disposed in the rightmost end position Ps to start moving leftward (S23). Based on the distance detected by the sensor 2, and on determining that the head 10 is disposed above the printing object M, the CPU 41 controls the head driver 33 on the basis of the print data referred to in the step S21, to eject the ink onto the printing object M from the head 10. Further, the CPU 41 controls the lamp 50 to emit the ultraviolet light. By virtue of this, the n-th line image is printed (S25).

Further, the CPU 41 drives the mobile recovering mechanism 71 when the ink is ejected from the head 10. By virtue of this, the mobile recovering mechanism 71 sucks the mist-like ink from the suction port 71A to recover the same (S25).

If the ink recovery method determined in the step S17 is the first ink recovery method (S27: Yes), then the CPU 41 carries out a first recovery process (S29; see FIG. 9). If the ink recovery method determined in the step S17 is the second ink recovery method (S27: No), then the CPU 41 carries out a second recovery process (S31; see FIG. 10). After the first recovery process or the second recovery process is finished, the CPU 41 lets the process proceeds to the step S33.

Referring to FIG. 9, the first recovery process will be explained. The CPU 41 determines whether or not there is a target nozzle, that is, a nozzle 10A in the state of not ejecting the ink continuously over a predetermined time in printing the n-th line image (S51). If the CPU 41 determines that there is no target nozzle (S51: No), then the first recovery process is finished and the process returns to the main process (see FIG. 8).

If the CPU 41 determines that there is a target nozzle, that is, a nozzle 10A in the state of not ejecting the ink continuously over the predetermined time (S51: Yes), then the CPU 41 determines whether or not the predetermined time has actually elapsed with the target nozzle in the state of not ejecting the ink (S53). If the CPU 41 determines that the predetermined time has not elapsed with the target nozzle in the state of not ejecting the ink (S53: No), then the process returns to the step S53. If the CPU 41 determines that the predetermined time has actually elapsed with the target nozzle in the state of not ejecting the ink (S53: Yes), then the process proceeds to the step S55.

Based on the distance detected by the sensor 2, the CPU 41 determines whether or not the head 10 is disposed in the predetermined position Pu (S55). If the CPU 41 determines that the head 10 is not disposed in the predetermined position Pu (S55: No), then the process returns to the step S55. If the CPU 41 determines that the head 10 is disposed in the predetermined position Pu (S55: Yes), then the CPU 41 stops the driving of the mobile recovering mechanism 71 started in the step S25 (S57; see FIG. 8). By virtue of this, the mobile recovering mechanism 71 is stopped from sucking the mist-like ink.

The CPU 41 controls the head driver 33 while continuously moving the carriage 20 leftward, to eject the ink from the target nozzle toward the ink recovery holes Cp of the platen 5 (S59). The ejected ink is recovered via the ink recovery holes Cp.

The CPU 41 determines whether or not the ink is finished with ejecting at the frequency determined in the step S19 (S61; see FIG. 8). If the CPU 41 determines that the ink is not finished with ejecting at the determined frequency (S61: No), then the process proceeds to the the step S63. Based on the distance detected by the sensor 2, the CPU 41 determines whether or not the head 10 is disposed continuously at the predetermined position Pu (S63). If the CPU 41 determines that the head 10 is disposed continuously at the predetermined position Pu (S63: Yes), then the process returns to the step S59. With the head 10 being disposed in the predetermined position Pu, the CPU 41 continues the operation of ejecting the ink from the target nozzle toward the ink recovery holes Cp of the platen 5.

If the CPU 41 determines that the ink is finished with ejecting at the determined frequency (S61: Yes) determined in the step S19 (see FIG. 8), then the CPU 41 controls the head driver 33 to stop the ink ejecting from the target nozzle. Then, the CPU 41 ends the first recovery process and returns the process to the main process (see FIG. 8).

Even if the ink is not finished with ejecting at the determined frequency (S61: No) but if the CPU 41 determines that the head 10 is not disposed at the predetermined position Pu (S63: No), then the CPU 41 controls the head driver 33 to stop the ink ejecting from the target nozzle. Then, the CPU 41 ends the first recovery process and returns the process to the main process (see FIG. 8).

Referring to FIG. 10, the second recovery process will be explained. In FIG. 10, the same alphanumeric number is assigned to a common step to that in the first recovery process (see FIG. 9), and any explanation therefor will be omitted or simplified.

The CPU 41 determines whether or not there is a target nozzle in printing the n-th line image (S51). If the CPU 41 determines that there is a target nozzle (S51: Yes), then the CPU 41 determines whether or not the predetermined time has actually elapsed with the target nozzle in the state of not ejecting the ink (S53). If the CPU 41 determines that the predetermined time has actually elapsed with the target nozzle in the state of not ejecting the ink (S53: Yes), then the process proceeds to the step S71.

Based on the signal outputted from the encoder 311, the CPU 41 determines whether or not the head 10 has moved to the leftmost end position Pt (S71). If the CPU 41 determines that the head 10 has not moved to the leftmost end position Pt (S71: No), then the process returns to the step S71. If the CPU 41 determines that the head 10 has moved to the leftmost end position Pt (S71: Yes), then the CPU 41 controls the main scanning motor 31 to stop the head 10 from moving leftward. Next, the CPU 41 stops driving the mobile recovering mechanism 71 (S73), which was started in the step S25 (see FIG. 8). By virtue of this, the mobile recovering mechanism 71 is stopped from sucking the mist-like ink.

The CPU 41 starts driving the ink recovering mechanism 72 (S74). The CPU 41 controls the head driver 33 to eject the ink from the target nozzle toward the ink recovering mechanism 72 (S75). The ejected ink is sucked and recovered via the suction port 72A of the ink recovering mechanism 72.

The CPU 41 determines whether or not the ink is finished with ejecting at the frequency determined in the step S19 (S77; see FIG. 8). If the CPU 41 determines that the ink is not finished with ejecting at the determined frequency (S77: No), then the process returns to the step S75. The CPU 41 continues the operation of ejecting the ink from the target nozzle toward the ink recovering mechanism 72 until the ink is finished with ejecting at the determined frequency.

If the CPU 41 determines that the ink is finished with ejecting at the determined frequency (S77: Yes) determined in the step S19 (see FIG. 8), then the CPU 41 controls the head driver 33 to stop the ink ejecting from the target nozzle. The CPU 41 stops driving the ink recovering mechanism 72 (S79). Then, the CPU 41 ends the second recovery process and returns the process to the main process (see FIG. 8).

Returning to FIG. 8, after the first recovery process (S29) is finished, the CPU 41 determines whether or not the head 10 has moved to the leftmost end position Pt (S33). If the CPU 41 determines that the head 10 has not arrived at the leftmost end position Pt (S33: No), then the process returns to the step S33. The CPU 41 continues the leftward movement of the head 10 started in the step S23 until the head 10 arrives at the leftmost end position Pt. If the CPU 41 determines that the head 10 has arrived at the leftmost end position Pt (S33: Yes), then it controls the main scanning motor 31 to stop the head 10 from moving leftward. Note that in a case that the second recovery process (see FIG. 10) is carried out, the head 10 has already arrived at the leftmost end position Pt and the head 10 has been stopped from moving leftward. With that, the n-th line image is finished with printing for the print image.

The CPU 41 determines whether or not to print the next line image based on the print data (S35). If the CPU 41 determines to print the next line image (S35: Yes), then the process proceeds to the step S37. The CPU 41 controls the main scanning motor 31 to move the head 10 from the leftmost end position Pt to the rightmost end position Ps (S37). The CPU 41 controls the sub scanning motor 32 to move the platen 5 rearward as far as the length of the n-th line image finished with printing in the front/rear direction (S39). The CPU 41 adds 1 to the variable n stored in the RAM 43 to update the same (S41). The CPU 41 returns the process to the step S21. Based on the updated variable n, the CPU 41 repeats the process of the steps S21 to S35. By virtue of this, the plurality of line images are printed on the printing object M.

If the CPU 41 determines, based on the print data, that the line images included in the print image are all finished with printing (S35: No), then the main process is ended.

Functions and Effects of the Embodiment

During the very period from the start to the end of printing the print image, the printer 1 ejects the ink from the target nozzle of the head 10 toward the ink recovery holes Cp or the ink recovering mechanism 72. By virtue of this, the printer 1 discharges the ink remaining in the target nozzle to prevent the target nozzle from clogging. On this occasion, in the printer 1, even if some of the ink supplied to the target nozzle for forming the print image remains in the target nozzle, it is possible to immediately discharge the ink from the target nozzle during the printing of the print image. Therefore, it is possible to appropriately prevent the target nozzle from clogging.

When the ink is ejected from the head 10 for printing the print image, the printer 1 drives the mobile recovering mechanism 71 to recover the mist-like ink. On the other hand, when the ink is ejected from the target nozzle toward the ink recovery holes Cp or the ink recovering mechanism 72, the printer 1 stops driving the mobile recovering mechanism 71. By virtue of this, the printer 1 can prevent the ejecting direction of the ink ejected from the target nozzle from variation due to driving the mobile recovering mechanism 71. Therefore, the printer 1 can reduce the possibility of adhering the ink ejected from the target nozzle toward the ink recovery holes Cp or the ink recovering mechanism 72 to other parts than the ink recovery holes Cp or the ink recovering mechanism 72.

By the first ink recovery method, the printer 1 recovers the ink ejected from the target nozzle via the ink recovery holes Cp of the platen 5. In this case, the printer 1 can reduce the time needed to move the head 10 to the predetermined position Pu during the printing of the print image. Therefore, in the printer 1, even if some of the ink supplied to the head 10 for printing remains in the target nozzle, it is possible to prevent the target nozzle from clogging by immediately discharging the ink from the target nozzle.

The printer 1 can cause the sensor 2 to specify the head 10 being disposed in the predetermined position Pu, and eject the ink from the target nozzle of the head 10 toward the ink recovery holes Cp of the platen 5.

The printer 1 prints the print image while moving the carriage 20 leftward. The sensor 2 is provided at the anterior (left) end of the moving direction of the head 10 in printing the print image. Therefore, the printer 1 can let the sensor 2 specify that the head 10 is moved to the predetermined position Pu facing the ink recovery holes Cp provided at the left side of the printing object M on the platen 5. Further, the printer 1 has the first sensor 21 at the front end of the carriage 20, and the second sensor 22 at the rear end of the carriage 20. Therefore, it is possible to lower the possibility of the head 10 deviating from the predetermined position Pu in the front/rear direction.

According to the second ink recovery method, during the period from the head 10 being finished with the leftward movement to the head 10 next starting the rightward movement, the ink is ejected from the target nozzle to the ink recovering mechanism 72. Therefore, in the printer 1, even if some of the ink supplied to the head 10 for printing the print image remains in the target nozzle, it is possible to prevent the target nozzle from clogging by immediately discharging the ink from the target nozzle during the printing.

According to the second ink recovery method, in the course of printing a line image, the printer 1 ejects the ink from the target nozzle to the ink recovering mechanism 72 after the head 10 has moved to the leftmost end position Pt. In this case, the printer 1 can reduce the time needed to move the head 10 to the leftmost end position Pt during the printing of the print image. Therefore, in the printer 1, even if some of the ink supplied to the head 10 for printing remains in the target nozzle, it is possible to prevent the target nozzle from clogging by immediately discharging the ink remaining in the target nozzle.

Based on the acquired print object information, the printer 1 determines the frequency of ejecting the ink from the target nozzle to the ink recovering mechanism 72. In this case, even if the driving condition differs in printing the print image according to a printing object, the printer 1 can still eject the ink from the target nozzle at the most suitable frequency according to each driving condition.

Based on the print object information, the printer 1 determines whether the first ink recovery method or the second ink recovery method is used to eject the ink from the target nozzle. Therefore, the printer 1 can switch according to each printing object M between ejecting the ink from the target nozzle toward the ink recovery holes Cp of the platen 5 and ejecting the ink from the target nozzle toward the ink recovering mechanism 72.

While the invention has been described in conjunction with various example structures outlined above and illustrated in the figures, various alternatives, modifications, variations, improvements, and/or substantial equivalents, whether known or that may be presently unforeseen, may become apparent to those having at least ordinary skill in the art. Accordingly, the example embodiments of the disclosure, as set forth above, are intended to be illustrative of the invention, and not limiting the invention. Various changes may be made without departing from the spirit and scope of the disclosure. Therefore, the disclosure is intended to embrace all known or later developed alternatives, modifications, variations, improvements, and/or substantial equivalents. Some specific examples of potential alternatives, modifications, or variations in the described invention are provided below.

<Modifications>

The printer 1 may drive the mobile recovering mechanism 71 to recover the mist-like ink when the ink is ejected from the target nozzle in the first recovery process (see FIG. 9) or in the second recovery process (see FIG. 10). Further, the printer 1 may control the mobile recovering mechanism 71 such that the sucking power for printing the print image may be smaller than the sucking power for ejecting the ink from the target nozzle in the first recovery process or in the second recovery process.

The ink recovery holes Cp of the platen 5 are not limited to the plurality of through holes arranged at the left side of the printing object M, among the plurality of through holes exposed in the platen 5 without the printing object M being placed thereon. Any through holes may function as the ink recovery holes Cp as far as the plurality of through holes are exposed without the printing object M being placed on the platen 5. For example, the ink recovery holes Cp may be a plurality of through holes arranged at the right side, the front side, or the rear side of the printing object M, among the plurality of through holes without the printing object M being placed on the platen 5. Further, instead of a plurality of through holes, an ink absorbent member such as a sponge or the like may be provided in an area out of but adjacent to the area of placing the printing object M on the platen 5. In this case, the ink absorbent member functions as a recovering mechanism for the ink Iq. In this case, the suction mechanism such as a sponge or the like may either be provided or not be provided.

The printer 1 may detect the head 10 being disposed in the predetermined position Pu by another configuration than using the sensor 2 to function as the ranging sensor. For example, the printer 1 may have a contact sensor on the platen 5 to allow the same to detect the part of the platen 5 placing the printing object M. The printer 1 may specify the predetermined position Pu on the basis of a detected result by the contact sensor. The printer 1 may determine whether or not the head 10 is in the predetermined position Pu on the basis of the signal outputted from the encoder 311 connected to the main scanning motor 31.

The sensor 2 may be provided at the left end of the head 10 but not at the left end of the carriage 20. The first sensor 21 may be provided at the front end of the head 10. The second sensor 22 may be provided at the rear end of the head 10.

Another ink recovering mechanism may be provided on the right side of the platen 5. The printer 1 may also print the print image when the head 10 is moved rightward in the same manner as when the head 10 is moved leftward. In this case, the printer 1 may eject the ink from the target nozzle toward the ink recovering mechanism provided on the right side of the platen 5 with the head 10 being disposed in the rightmost end position Ps.

The ink recovering mechanism 72 may be provided below and at the right side to the leftmost end position Pt of the head 10. In this case, the printer 1 may eject the ink from the target nozzle to the ink recovering mechanism 72 with the head 10 is stopped before moving leftward up to the leftmost end position Pt.

The printer 1 may determine the ink amount ejected from the target nozzle on the basis of the print object information.

Part of the ultraviolet light emitted from the lamp 50 may be reflected from the printing object M to reach to the head 10 and cure the ink in some nozzles. Note that the thicker the printing object M, the more intent the reflected light reaching to the head 10. Therefore, the thicker the printing object M, the more likely the reflected light to cure the ink in the nozzles.

Therefore, for example, the print object information may further include information indicating the thickness of the printing object M. Then, the printer 1 may increase the frequency or the ink amount of the head 10 ejecting the ink in the ink recovery process as the printing object M is thicker, on the basis of the information indicating the thickness of the printing object M included in the print object information.

The printer 1 may determine whether the first ink recovery method or the second ink recovery method is applied to eject the ink from the target nozzle, according to the user's operation on the operation unit 37. The printer 1 may carry out only one of the first ink recovery method and the second ink recovery method, without carrying out the other.

OTHER ASPECTS

The predetermined position Pu or the leftmost end position Pt corresponds to the "predetermined position" of the present disclosure. The predetermined position Pu corresponds to the "first predetermined position" of the present disclosure, and the leftmost end position Pt corresponds to the "second predetermined position" of the present disclosure. The ink recovery holes Cp of the platen 5 and the ink recovering mechanism 72 correspond to the "ink recovering mechanism" of the present disclosure. The ink recovery holes Cp are one example of the "first recovering mechanism" of the present disclosure. The ink recovering mechanism 72 are one example of the "second recovering mechanism" of the present disclosure. The CPU 41 is one example of the "controller" of the present disclosure. The period from the start to the end of printing the print image is one example of the "printing period" of the present disclosure. The left/right direction is one example of the "main scanning direction" of the present disclosure. The left side is one example of the "one side in the main scanning direction" of the present disclosure. The front/rear direction is one example of the "sub scanning direction" of the present disclosure. The timing of disposing the head 10 into the predetermined position Pu facing the ink recovery holes Cp of the platen 5 during the carriage 20 moving the head 10 from the rightmost end position Ps to the leftmost end position Pt is one example of the "first timing" of the present disclosure. The timing in the period from the head 10 finished with moving leftward to the head 10 started to move rightward is one example of the "second timing" of the present disclosure.

What is claimed is:

1. A printer comprising:

a platen;

a head having a plurality of nozzles and configured to eject light-curable ink from the plurality of nozzles;

a lamp configured to emit light;

a carriage configured to support the head and the lamp, and to move the head and the lamp in a main scanning direction;

an ink recovering mechanism facing a predetermined position within a predetermined area where the head is movable with movement of the carriage, including a pump, and configured to recover the light-curable ink ejected from the head; and a controller configured to control the head, the lamp, the carriage, and the ink recovering mechanism, wherein the controller is configured to:

acquire print data for printing a print image on a printing object, the print image including a plurality of line images;

cause the head to eject the light-curable ink while moving the carriage in the main scanning direction to print each of the plurality of line images on the printing object;

determine whether a target nozzle is included in the plurality of nozzles when printing a predetermined line image included in the plurality of line images, the target nozzle being a nozzle in a state of not ejecting the light-curable ink over a predetermined time during a printing of the predetermined line image;

in a case where the target nozzle is included in the plurality of nozzles, cause the carriage to move the head and dispose the head at the predetermined position, and cause the head to eject the light-curable ink toward the ink recovering mechanism with the head facing and being separated from the ink recovering mechanism while driving the pump of the ink recovering mechanism to suck the light-curable ink ejected from the head;

after recovering the light-curable ink ejected from the head by driving the pump of the ink recovering mechanism, determine whether a next line image to be printed on the printing object is included in the plurality of line images;

in a case where the next line image is included in the plurality of line images, cause the head to eject the light-curable ink while moving the carriage in the main scanning direction to print the next line image on the printing object.

2. The printer according to claim 1, further comprising a mobile recovering mechanism supported by the carriage and configured to move together with the head to recover the light-curable ink ejected from the head, wherein the controller is configured to stop recovering the light-curable ink by the mobile recovering mechanism, under a condition that the light-curable ink ejected from the head is recovered by the ink recovering mechanism.

3. The printer according to claim 1, wherein the ink recovering mechanism is provided as a part of the platen, and the controller is configured to:

dispose the head at the predetermined position facing the ink recovering mechanism;

cause the head to eject the light-curable ink toward the ink recovering mechanism with the head being disposed at the predetermined position; and cause the ink recovering mechanism to recover the light-curable ink ejected from the head.

4. The printer according to claim 3, further comprising a sensor configured to detect a distance between the head and the printing object, wherein the controller is configured to specify that the head has been moved to the predetermined position based on a result detected by the sensor.

5. The printer according to claim 4, wherein the carriage is configured to:

support the head and the lamp with the head being disposed on one side in the main scanning direction with respect to the lamp; and support the sensor at an end portion on the one side in the main scanning direction.

6. The printer according to claim 5, wherein the sensor includes a first sensor and a second sensor, and the carriage is configured to:

support the first sensor at an end on one side in a sub scanning direction orthogonal to the main scanning direction; and support the second sensor at another end on the other side in the sub scanning direction.

7. The printer according to claim 1, wherein the controller is configured to cause the carriage to move the head and dispose the head at the predetermined position at a timing included in a period of time between completion of movement in the main scanning direction of the head by the carriage and next start of the movement in the main scanning direction of the head by the carriage.

8. The printer according to claim 7, wherein the carriage is configured to support the head and the lamp with the head being disposed on one side in the main scanning direction with respect to the lamp, and the predetermined position is a position of the head at completion of movement toward the one side in the main scanning direction of the head by the carriage.

9. The printer according to claim 1, wherein the controller is configured to:

acquire printing object information related to the printing object; and determine ejection frequency of the light-curable ink from the head toward the ink recovering mechanism based on the printing object information acquired.

10. A printer comprising:

a platen;

a head having a plurality of nozzles and configured to eject light-curable ink from the plurality of nozzles;

a lamp configured to emit light;

a carriage configured to support the head and the lamp, and to move the head and the lamp in a main scanning direction;

a first recovering mechanism provided in a part of the platen to face a first predetermined position within a predetermined area where the head is movable with movement of the carriage, including a first pump, and configured to recover the light-curable ink ejected from the head;

a second recovering mechanism facing a second predetermined position within the predetermined area, including a second pump, and configured to recover the light-curable ink ejected from the head; and a controller configured to control the head, the lamp, the carriage, the first recovering mechanism, and the second recovering mechanism, wherein the controller is configured to:

acquire print data for printing a print image on a printing object and, the print image including a plurality of line images;

acquire printing object information related to the printing object;

cause the head to eject the light-curable ink while moving the carriage in the main scanning direction to print each of the plurality of line images on the printing object;

determine whether a target nozzle is included in the plurality of nozzles when printing a predetermined line image included in the plurality of line images, the target nozzle being a nozzle in a state of not ejecting the light-curable ink over a predetermined time during a printing of the predetermined line image;

in a case where the target nozzle is included in the plurality of nozzles, cause the head to be disposed at the first predetermined position at a first timing during the printing of the predetermined line image and cause the head to eject the light-curable ink toward the first recovering mechanism with the head facing and being separated from the first recovering mechanism while driving the first pump of the first recovering mechanism to suck the light-curable ink ejected from the head, or cause the head to be disposed at the second predetermined position at a second timing after the printing of the predetermined line image and before printing of a next line image to be printed next to the predetermined line image and cause the head to eject the light-curable ink toward the second recovering mechanism with the head facing and being separated from the second recovering mechanism while driving the second pump of the second recovering mechanism to suck the light-curable ink ejected from the head;

after recovering the light-curable ink ejected from the head by driving the first pump of the first recovering mechanism or the second pump of the second recovering mechanism, determine whether the next line image is included in the plurality of line images; and in a case where the next line image is included in the plurality of line images, cause the head to eject the light-curable ink while moving the carriage in the main scanning direction to print the next line image on the printing object, wherein the controller is configured to switch between causing the head to eject the light-curable ink toward the first recovering mechanism and causing the head to eject the light-curable ink toward the second recovering mechanism, according to the printing object information acquired.

11. The printer according to claim 10, further comprising a sensor configured to detect a distance between the head and the printing object, wherein the controller is configured to specify that the head has been moved to the first predetermined position based on a result detected by the sensor.

12. The printer according to claim 10, wherein the carriage is configured to support the head and the lamp with the head being disposed on one side in the main scanning direction with respect to the lamp, and the second predetermined position is a position of the head at completion of movement toward the one side in the main scanning direction of the head by the carriage.

13. A printing method carried out by a printer, the printer comprising:

a platen;

a head having a plurality of nozzles and configured to eject light-curable ink from the plurality of nozzles;

a lamp configured to emit light;

a carriage configured to support the head and the lamp, and to move the head and the lamp in a main scanning direction; and an ink recovering mechanism facing a predetermined position within a predetermined area where the head is movable with movement of the carriage, including a pump, and configured to recover the light-curable ink ejected from the head, the printing method comprising:

acquiring print data for printing a print image on a printing object, the print image including a plurality of line images;

causing the head to eject the light-curable ink while moving the carriage in the main scanning direction to print each of the plurality of line images on the printing object;

determining whether a target nozzle is included in the plurality of nozzles when printing a predetermined line image included in the plurality of line images, the target nozzle being a nozzle in a state of not ejecting the light-curable ink over a predetermined time during a printing of the predetermined line image;

in a case where the target nozzle is included in the plurality of nozzles, causing the carriage to move the head and dispose the head at the predetermined position, and causing the head to eject the light-curable ink toward the ink recovering mechanism with the head facing and being separated from the ink recovering mechanism while driving the pump of the ink recovering mechanism to suck the light-curable ink ejected from the head;

after recovering the light-curable ink ejected from the head by driving the pump of the ink recovering mechanism, determine whether a next line image to be printed on the printing object is included in the plurality of line images; and in a case where the next line image is included in the plurality of line images, cause the head to eject the light-curable ink while moving the carriage in the main scanning direction to print the next line image on the printing object.

14. The printing method according to claim 13, wherein the printer further comprises a mobile recovering mechanism supported by the carriage and configured to move together with the head to recover the light-curable ink ejected from the head, and recovering the light-curable ink by the mobile recovering mechanism is stopped under a condition that the light-curable ink ejected from the head is recovered by the ink recovering mechanism.

15. A printing method carried out by a printer, the printer comprising:

a platen;

a head having a plurality of nozzles and configured to eject light-curable ink from the plurality of nozzles;

a lamp configured to emit light;

a carriage configured to support the head and the lamp, and to move the head and the lamp in a main scanning direction;

a first recovering mechanism provided in a part of the platen, facing a first predetermined position within a predetermined area where the head is movable with movement of the carriage, including a first pump, and configured to recover the light-curable ink ejected from the head;

a second recovering mechanism facing a second predetermined position within the predetermined area, including a second pump, and configured to recover the light-curable ink ejected from the head; and a controller configured to control the head, the lamp, the carriage, the first recovering mechanism, and the second recovering mechanism, the printing method comprising:

acquiring print data for printing a print image on a printing object and, the print image including a plurality of line images;

acquiring printing object information related to the printing object;

causing the head to eject the light-curable ink while moving the carriage in the main scanning direction to print each of the plurality of line images on the printing object;

determine whether a target nozzle is included in the plurality of nozzles when printing a predetermined line image included in the plurality of line images, the target nozzle being a nozzle in a state of not ejecting the light-curable ink over a predetermined time during a printing of the predetermined line image;

in a case where the target nozzle is included in the plurality of nozzles, causing the head to be disposed at the first predetermined position at a first timing during the printing of the predetermined line image and causing the head to eject the light-curable ink toward the first recovering mechanism with the head facing and being separated from the first recovering mechanism while driving the first pump of the first recovering mechanism to suck the light-curable ink ejected from the head, or causing the head to be disposed at the second predetermined position at a second timing after the printing of the predetermined line image and before printing of a next line image to be printed next to the predetermined line image and cause the head to eject the light-curable ink toward the second recovering mechanism with the head facing and being separated from the second recovering mechanism while driving the second pump of the second recovering mechanism to suck the light-curable ink ejected from the head;

after recovering the light-curable ink ejected from the head by driving the first pump of the first recovering mechanism or the second pump of the second recovering mechanism, determining whether the next line image is included in the plurality of line images; and in a case where the next line image is included in the plurality of line images, causing the head to eject the light-curable ink while moving the carriage in the main scanning direction to print the next line image on the printing object, wherein whether causing the head to eject the light-curable ink toward the first recovering mechanism or causing the head to eject the light-curable ink toward the second recovering mechanism is switched according to the printing object information acquired.

* * * * *